Figure 1:
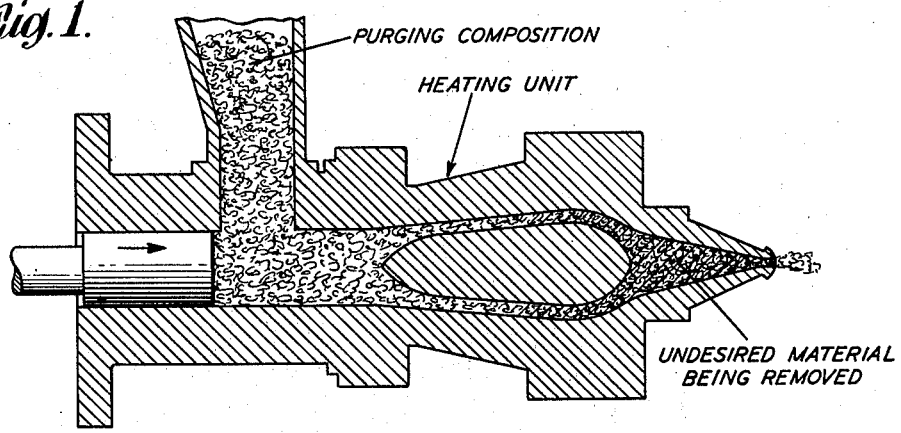

April 11, 1944.   L. K. MERRILL ET AL   2,346,228
METHOD AND COMPOSITION FOR PURGING PLASTIC FABRICATING MACHINES
Filed June 25, 1940

INVENTORS
LEON K. MERRILL
WILLIAM R. WHEELER
BY
ATTORNEY

Patented Apr. 11, 1944

2,346,228

UNITED STATES PATENT OFFICE 2,346,228

METHOD AND COMPOSITION FOR PURGING PLASTIC FABRICATING MACHINES

Leon K. Merrill, Rocky River, and William R. Wheeler, Lakewood, Ohio, assignors to Carbide and Carbon Chemicals Corporation, a corporation of New York Application June 25, 1940, Serial No. 342,268

9 Claims. (Cl. 18—48)

This invention relates to a method of removing material from the processing chambers of plastic fabricating equipment, and it also relates to a special purging or scoring composition which may be employed in such a method. The method and composition have been found to be particularly useful in removing material from the heating chambers of injection molding machines.

In the injection molding method of fabricating plastic articles a powdered or granular molding composition is intermittently fed under pressure into a heating chamber in which it is softened and brought to a semi-fluid or molten condition by application of heat. The powdered material, in moving into the heating chamber, displaces an equal amount of the semi-fluid material into a mold through a nozzle at the effluent end of the chamber, thus producing an article of a desired shape.

In the operation of plastic fabricating machines, it may be desirable from time to time, to change the molding material which is being used, to a material having a basically different chemical composition. Generally, the various molding compositions which are employed, for example, compositions containing cellulose acetate, cellulose acetobutyrate, a polystyrene resin, or a vinyl resin, are mutually incompatible. That is, if a mixture of such incompatible compositions were injected into a mold, an article having low mechanical strength and other undesirable characteristics would result. Moreover, one thermoplastic molding composition may decompose at the temperature required to bring another such composition to a suitable molding condition, thus resulting in discolored and inferior molded articles. In some operations it may be desirable to use molding materials which differ only with respect to the color of the article produced. For example, it may be desirable to change from a polystyrene resin molding composition which produces black articles to a polystyrene resin molding composition which produces light green articles. Unless the black composition is entirely removed from the processing chambers of the machine, the articles produced from the green composition will be contaminated and discolored with the black composition. For these and other reasons it is generally necessary to remove completely one molding composition from the processing chambers of a plastic fabricating machine before a second molding composition can be successfully employed therein.

Likewise, it is frequently necessary to clean out the processing chambers of a plastic fabricating machine even though a single molding composition is continually used therein, because local overheating may have decomposed some of the composition, causing it to temporarily adhere to the walls of the processing chambers from which it may be subsequently dislodged, and contaminate and discolor the articles produced.

The removal of undesired material, such as molding compositions or decomposed material, from the processing chambers of plastic fabricating machines, and particularly from the heating chambers of such machines, has heretofore been extremely difficult because of the shape and construction-features of the heating chambers, and because of the adhesive character of the molding compositions or decomposed material which causes them to adhere tenaciously to the hot internal surfaces of the processing chambers of the machines. In the past, two methods for removing undesired material from such chambers have been employed. One method consisted of dismantling the machine and removing the undesired material by mechanical methods, such as scraping. The other method consisted of adjusting the temperature of the heating chamber to insure that the material passing through the machine would be softened and brought to a molten condition, and then forcing a molding composition through the machine until all the undesired material was purged therefrom. The former of these procedures was laborious and time-consuming, and in some cases where complicated heating chamber construction hindered ready dismantling, it was necessary to have on hand a number of expensive interchangeable heating chambers so that the operation of the machine need not be stopped for long periods. The latter of the above-described procedures, was also time-consuming and wasted considerable of the purging molding composition since it was necessary to discard all the effluent material which contained any of the undesired material. Moreover, when changing from one molding composition to another, the latter procedure was often not entirely successful since deposits of the undesired composition might remain in the recesses of the heating chamber. For example, in changing from a high-softening point polystyrene resin molding composition to a low-softening point vinyl resin molding composition, when a temperature suitable for bringing the vinyl resin composition to a correct molding condition is used, the polystyrene resin composition may not be softened sufficiently to permit complete purging thereof by the vinyl resin composition, and particles of the polystyrene resin composition may be left on the walls of the processing chambers.

In order to overcome these cleaning difficulties, we have provided a novel method of removing undesired materials from the processing chambers of plastic fabricating machines, and we have also provided a special purging or scouring composition which is preferably employed in carrying out this method. In accordance with our method, the machine is emptied of molding composition as well as possible, the temperature of the heating chamber is suitably adjusted, the undesired material is entirely removed from the processing chambers by passing a special purging composition therethrough until the effluent material contains only the purging composition, and then the purging composition is removed from the chambers by passing a desired molding composition therethrough until the effluent material contains only this desired molding composition. The temperature of the heating chamber should be as low as possible so that the fullest advantage may be taken of the exceptional frictional scouring properties of the purging composition, and yet the temperature of the chambers should be high enough to soften the undesired material sufficiently so that it will flow readily under the applied force. The purging composition is most conveniently employed in a granular form, having the approximate particle size of commercial molding compositions. The facility with which our special purging composition removes undesired materials in this manner and the ease with which the special purging composition is removed by molding compositions are due to the unusual properties of the purging composition, which are fully described hereinafter.

The difficulties encountered in purging the processing chambers of plastic fabricating machines when only a molding composition is used as the purging agent, are largely eliminated when our method is employed, and less time is required for the cleaning operation. Although our method may be employed successfully in changing from any commercially used molding composition to another, it is particularly effective when used in changing to or from a molding composition containing a resin of the type resulting from the conjoint polymerization of a vinyl halide with a vinyl ester of a lower aliphatic acid. Hereinafter, a resin of this type will be designated as a "Vinyl-copolymer resin." An example of such a resin is one formed by the conjoint polymerization of vinyl chloride with vinyl acetate. Economies in purging material are effected with our method because less of our special purging composition is required to satisfactorily clean the processing chambers of plastic fabricating machines than if only a molding composition is used as the purging agent.

The following three tables show the advantages of our disclosed method with respect to the methods previously employed. The tables relate to the removal from the processing chambers of an eight ounce Lester injection molding machine of a cellulose acetobutyrate molding composition, a polystyrene resin molding composition, and a "Vinyl-copolymer resin" molding composition.

TABLE I
*Mechanical method*

|  | Molding composition removed | | |
|---|---|---|---|
|  | Cellulose acetobutyrate | Polystyrene resin | "Vinyl-copolymer resin" |
| Minutes to dismantle chambers, clean mechanically, and reassemble | 150 | 165 | 120 |

TABLE II
*Purging with a molding composition only*

| Pounds of molding composition used as a purging agent | Molding composition removed | | |
|---|---|---|---|
|  | Cellulose acetobutyrate | Polystyrene resin | "Vinyl-copolymer resin" |
| (a) Cellulose acetate____pounds__ | 5–20 | 20–50 | 2 |
| (b) Cellulose acetobutyrate_____do____ |  | 20–50 | 2 |
| (c) Polystyrene resin_____do____ | 10–15 |  | 2 |
| (d) "Vinyl-copolymer resin"_____do____ | 10–40 | (¹) |  |
| Minutes to completely purge with (a) | 5–40 | 20–100 | 5–10 |
| Minutes to completely purge with (b) |  | 20–100 | 5–10 |
| Minutes to completely purge with (c) | 10–40 |  | 5–10 |
| Minutes to completely purge with (d) | 10–100 | (¹) |  |

¹ Generally impossible to remove.

TABLE III
*Purging by disclosed method*

|  | Molding composition removed | | |
|---|---|---|---|
|  | Cellulose acetobutyrate | Polystyrene resin | "Vinyl-copolymer resin" |
| (e) Pounds special purging composition required | 5 | 7 | 4 |
| (f) Pounds molding composition to remove purging composition | 2 | 2 | 2 |
| Minutes to perform complete changeover | 10 | 20 | 8 |

Figure 2:
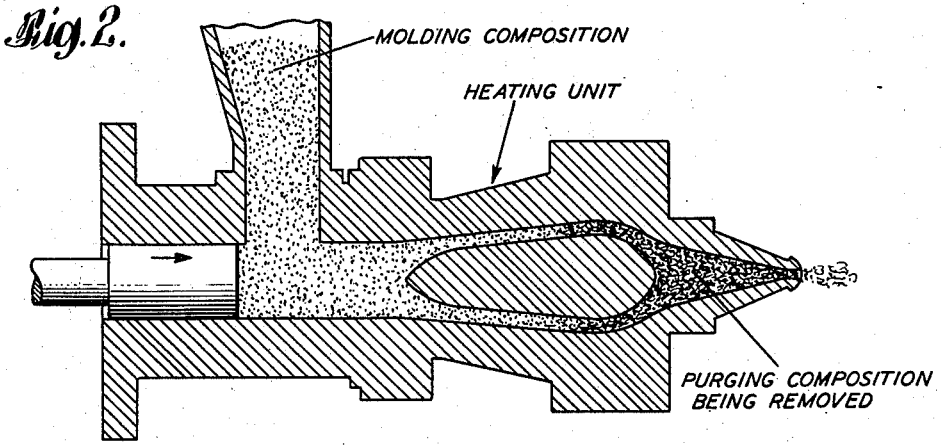

The drawing shown in Figures 1 and 2 illustrates the various steps of the process as practiced in an injection molding machine. We have found that a homogeneous mixture of a plasticized vinyl resin and an abrasive filler, in which mixture, lubricant and pigment are also preferably included, will effectively and rapidly remove undesired materials from the processing chambers of plastic fabricating machines, when employed in the method disclosed herein. Resins of the "Vinyl-copolymer resin" type which contain between about 85% and about 95% by weight of vinyl halide, and which have relatively high average macro-molecular weights, as determined by Staudinger's method, are preferably employed in our special purging composition. Such resins having an average macromolecular weight above about 15,000 are particularly preferred. The resin should be combined with a sufficient amount of plasticizer to form a colloidal dispersion product which is resilient and tough, and which, at the usual heating chamber operating temperatures, has frictional properties similar to those which rubber has at ordinary temperatures. The plasticizer may be any, such as triethylene glycol dihexoate or di(butoxyethyl) phthalate, which is commonly used to impart resilient characteristics to vinyl resins. The filler may be any having a mildly abrasive nature, such as diatomaceous earth, pulverized silicon dioxide, or slate flour. Depending on the particular vinyl resin employed in our special purging composition, as for instance, when the resin contains a vinyl halide, it may be desirable to include a sufficient amount of suitable stabilizer to prevent decomposition of the resin at the heating chamber operating temperatures.

The purging effectiveness of our special composition may be attributed to the frictional properties of the plasticized resin employed therein, to the abrasive nature of the filler, and to the fact that such compositions are capable of flowing throughout a wide range of temperatures without becoming extremely soft or fluid. By reason of these characteristics, upon forcing such a purging composition through the processing chambers of a plastic fabricating machine at suitable temperatures, undesired materials on the walls of such chambers will be frictionally purged therefrom. Usually, 1½ to 10 complete cylinder charges of the purging composition are sufficient to remove completely the undesired material from the walls of the processing chambers. The preferred operating temperature range is between about 100 degrees centigrade and about 200 degrees centigrade, although the purging composition may be employed successfully at other temperatures. The purging composition will not adhere tenaciously to the walls of the processing chambers, but may be readily displaced therefrom by passing a molding composition through the chambers. This is attributable to the inherent non-adhesive character of the plasticized vinyl resin employed in the special composition, and to the lubricant and stabilizer which may be included therein.

Our special purging composition contains between about 20% and about 85% by weight of vinyl resin and the proportions of plasticizer and abrasive filler, based on the total weight of such composition, should vary within about the following limits:

| | Per cent |
|---|---|
| Plasticizer | 5 to 60 |
| Abrasive filler | 2 to 60 |

The ratio of the amount of plasticizer to the amount of resin should vary between about 1/17 and about 3, and the ratio of the amount of abrasive filler to the amount of resin should vary between about 1/43 and about 3. Two preferred examples of our purging composition which have been found to be particularly effective, contain the following ingredients in parts by weight:

| | Example A | Example B |
|---|---|---|
| Resin formed by conjoint polymerization of vinyl chloride with vinyl acetate (95% vinyl chloride) | 59.5 | 49.5 |
| Triethylene glycol dihexoate | ¹ 25.0 | 25.0 |
| Silicon dioxide ("Superfloss") | 10.0 | 20.0 |
| Lead stearate | 2.0 | 2.0 |
| Dehydrated castor oil ("Isoline") | 1.5 | 1.5 |
| Titanium dioxide | 2.0 | 2.0 |

¹ Di(butoxyethyl) phthalate.

It is to be understood that the method herein described is not limited in its application to purging of injection molding machines, but may be applied as well in cleaning other types of plastic fabricating equipment, such as extrusion machines. It is also apparent that variations may be made in the ingredients and in the proportions of ingredients contained in our purging composition within the limits specified in the appended claims.

We claim:

1. An injection molding machine purging composition comprising a granular mass containing a vinyl resin, plasticizer between about 5% and about 60% by weight of the composition, and mildly abrasive filler between about 2% and about 60% by weight of the composition, the vinyl resin comprising at least about 20% by weight of the composition.

2. An injection molding machine purging composition comprising a granular mass containing a colloidal dispersion of a vinyl resin with a plasticizer, and a mildly abrasive filler, said vinyl resin containing at least 85% combined vinyl chloride and comprising at least about 20% by weight of the composition, the amount of the plasticizer being between about 5% and about 60% by weight of the composition, and the amount of the mildly abrasive filler being between about 2% and about 60% by weight of the composition.

3. An injection molding machine purging composition comprising a granular mass containing a colloidal, resilient dispersion of about 49.5 to about 59.5 parts of vinyl resin, about 25 parts of a plasticizer and about 10 to 20 parts of a mildly abrasive filler, said vinyl resin being a conjoint polymer of vinyl chloride with vinyl acetate containing about 85% to about 95% of vinyl chloride, and having an average macromolecular weight above about 15,000.

4. A method for removing undesired material from the processing chambers of a plastic fabricating machine, comprising displacing said undesired material from said chambers with a purging composition consisting essentially of a stable, plasticized, vinyl resin and an abrasive filler, and displacing said purging composition with a molding composition.

5. A method as claimed in claim 2 in which said resin is substantially identical with that formed by the conjoint polymerization of a vinyl halide with a vinyl ester of a lower aliphatic acid and which has an average macromolecular weight above about 15,000.

6. A method of removing undesired material from the walls of the processing chambers of a plastic fabricating machine, which comprises the successive steps of forcing a purging composition consisting essentially of a tough resinous material and an abrasive against and past said walls, and then forcing a molding composition against and past said walls.

7. A method for removing undesired material from the processing chambers of a plastic fabricating machine, comprising the successive steps of feeding a scouring composition consisting essentially of an abrasive and a tough resinous material into said machine, forcing said scouring composition through said machine until only said scouring composition flows therefrom, feeding a molding composition into said machine, and forcing said molding composition through said machine until only said molding composition flows therefrom.

8. A method for removing undesired material from the processing chambers of a plastic fabricating machine, comprising forcing a purging composition, consisting essentially of a tough resinous material and an abrasive, through said chambers until only said purging composition flows therefrom, the temperature of said chambers previously having been adjusted so that said undesired material will be softened sufficiently to flow readily under the applied force, and forcing a molding composition through said chambers until only said molding composition flows therefrom.

9. In a method of removing undesired material from the processing chambers of a plastic fabricating machine, the step of purging such chambers of such undesired material by forcing through such chambers a mildly abrasive purging composition including a vinyl resin substantially identical with that formed by the conjoint polymerization of a vinyl halide with a vinyl ester of a lower aliphatic acid and containing between about 85% and about 95% by weight of such vinyl halide.

LEON K. MERRILL.
WILLIAM R. WHEELER.

CERTIFICATE OF CORRECTION.

Patent No. 2,346,228. April 11, 1944.

LEON K. MERRILL, ET AL.

It is hereby certified that error appears in the printed specification of the above numbered patent requiring correction as follows: Page 3, first column, the paragraph beginning with the word "It" in line 54, and ending with "claims." in line 59, now appearing as a footnote should have been printed in regular size type so as to be read as a part of the specification, and the footnote reference numeral "1" appearing at the beginning of said paragraph should be cancelled; page 3, second column, line 23, for the claim reference numeral "2" read --4--; and that the said Letters Patent should be read with this correction therein that the same may conform to the record of the case in the Patent Office.

Signed and sealed this 6th day of June, A. D. 1944.

(Seal)

Leslie Frazer
Acting Commissioner of Patents.